SYNCHRONOUS OPERATION OF BEAM SWITCHING TUBES FOR COLOR SIGNAL GATING

Filed March 7, 1956 4 Sheets-Sheet 1

INVENTORS
LAURENCE R. BROWN
SIN-PIN FAN
BY
Charles F. Carroll, Jr.
ATTORNEY

INVENTORS
LAURENCE R. BROWN
SIN-PIH FAN
BY
Charles F. Carroll, Jr.
ATTORNEY

INVENTORS
LAURENCE R. BROWN
SIN-PIN FAN
BY
Charles F. Carroll, Jr.
ATTORNEY

SYNCHRONOUS OPERATION OF BEAM SWITCHING TUBES FOR COLOR SIGNAL GATING

Filed March 7, 1956

INVENTORS
LAURENCE R. BROWN
SIN-PIN FAN
BY Charles F. Carroll, Jr.
ATTORNEY 3,003,023
Patented Oct. 3, 1961

3,003,023

SYNCHRONOUS OPERATION OF BEAM SWITCHING TUBES FOR COLOR SIGNAL GATING

Laurence R. Brown, Berwyn, and Sin-pih Fan, Philadelphia, Pa.; said Brown assignor to Burroughs Corporation, Detroit, Mich., a corporation of Michigan Filed Mar. 7, 1956, Ser. No. 574,355
4 Claims. (Cl. 178—5.4)
(Filed under Rule 47(a) and 35 U.S.C. 116)

This invention relates to a method for synchronizing the position of the rotating electron beam in the magnetron beam switching tube with selected phase angle or angles of one or more external frequency signals such as a color television reference signal.

The single gun, tricolor cathode ray tube is described in detail in Proceedings of the Institute of Radio Engineers, vol. 41, pp. 851–858, July 1953. It uses a single beam of electrons and a conventional beam-deflecting magnetic yoke. The phosphor screen is built up of sets of three phosphor strips, each strip of which fluoresces in one of the colors red, green, or blue. The sequence of strip arrangement is red, green, blue, green, red, and so on. The color displayed at any instant is not determined by the primary beam deflecting structure but is determined by potentials on color control electrodes. These color control electrodes are fine wires, with a separate wire in optical alignment with each red and each blue phosphor strip. All the wires aligned with red phosphor strips are connected to one terminal of the tube's switching circuit, and all wires aligned with blue phosphor strips are connected to the other terminal of the tube's switching circuit. With a proper magnitude accelerating voltage equally applied on all wires, the beam is focused between wires, striking the green phosphor strips. If an additional potential is applied between adjacent wires, the beam will be deflected to the phosphor strip aligned with the more positive wire. The beam deflecting structure in combination with external deflecting circuits will sweep across successive or interlaced/alternate sets of the three phosphor strips, in a sequence determined by the deflection scheme being used.

A high degree of resolution and fully balanced color presentation require that the beam be swept vertically across all three color strips in a period comparable to the time it takes the horizontal sweep circuit to move the electron beam across the diameter of the fluorescent spot which the eye can resolve. If each color is sampled at a rate of 350 times per line, dot separation is less than the angular resolving power of a human eye. With the green phosphor strip activated every time the switching signal goes through zero on its excursions to red and blue, a full color-sampling cycle has four samples of color information. This sampling rate of 4 dots per sampling cycle and 350 cycles per line corresponds to a switching rate in excess of 6 megacycles. By using dot interlace, apparent dot rate can be doubled; so the switching rate can be reduced to somewhat in excess of 3 megacycles without apparent dot separation and dot-sequential type of color presentation still can be provided. If the switching rate is reduced to one third the horizontal sweep frequency and is synchronized with it, and the gating sequence between colors is at the horizontal sweep frequency so that one color only is excited on each horizontal sweep, then line sequential color presentation would be provided. The switching voltage would have to be a complex wave which deflects the beam so as to be on one phosphor strip for all of a horizontal sweep, and to move to the other strips for successive horizontal sweeps.

The 3.58 megacycle color subcarrier frequency of the NTSC signal immediately occurs as a highly convenient and suitable switching signal and would permit use of dot interlace. However, the switching and gating circuit of this invention is not dependent upon any particular switching frequency.

Frequent reference will be made to background data contained in the IRE's "Second Color Television Issue" of the Preceedings of the IRE, vol. 42, No. 1, pp. 299–315. On FIG. 3, p. 310, and FIG. 6, p. 312, of this reference, the switching and gating signals now contemplated for single gun tubes are shown. FIG. 3 is for a system wherein the light outputs for each primary color are added to produce the tube's light output. FIG. 6 is for a system wherein color-difference or chrominance signals are combined with a brightness or luminance signal within the tube's electron gun. Inspection of the waveforms of the gating pulses shown in these reference figures reveals that they are portions of sine waves phased to reach maximum at the instant the electron beam centers on the strip of corresponding color. This arrangement provides for electron bombardment and consequent phosphor illumination of the strips for short portions of the sampling cycle's period. With such short duty cycles of illumination a large fraction of each sampling cycle is lost between illuminating gating pulses and low overall brilliance results.

An additional difficulty arises in the use of sinusoidal gating signals to control video amplifiers, wherein both inputs are applied to control the gain of an amplifying device as is shown in FIG. 4, p. 311, of this "Second Color TV Issue." In this circuit video inputs are applied to control grid and gating signals are applied to the screen-grid of a vacuum tube. The amplitude of an output pulse will be determined by the amplitudes of both the video and the gating signals. The gating signal performs a screen-grid modulation of the output video signal. Hence, if the gating signal varies in amplitude during the gated period, the video signal will be modulated and thus distorted.

Improved gating is achieved when the "duty-cycle" of electron bombardment and consequent illumination of each phosphor strip is as much of the sampling cycle as the beam switching signal will allow, without spilling over into adjacent strips as the beam is switched. The improvement is even greater when the gating circuit's transfer of video signals is not undesirably modulated by the gating signal, i.e. the gating signals turn the respective video inputs on or off but do not affect each video's amplitude while on. The Magnetron Beam Switching tube provides such square wave outputs in the gating circuits as disclosed and claimed in copending application Serial No. 438,805, now U.S. Patent No. 2,848,647, by Saul Kuchinsky and Hilary Moss entitled "Multiplexing System," and used in this invention.

An object of this invention is to provide a novel gating circuit wherein gating signal circuits and video amplifiers are activated in succession and remain activated until the succeeding amplifier is activated.

Another object of this invention is to provide an improved gating circuit for a single-gun color type cathode ray tube, wherein gating signals switch the beam of a Magnetron Beam Switching tube to successive outputs which in turn activate associated video amplifiers, and wherein each activated amplifier continues to operate until the Magnetron Beam Switching tube is switched to the next position.

Another object of this invention is to provide an improved gating circuit for a single-gun color type cathode ray tube, wherein gating signals switch the beam of a Magnetron Beam Switching tube to successive outputs at precise times during a gating cycle to activate successive video amplifiers, and wherein each video amplifier is thereby gated from cut-off to optimum dynamic gain and returned to cut-off, but is otherwise unmodulated by the gating signals.

Another object of this invention is to provide an improved gating circuit having a plurality of separate amplifier channels and a succession of two position clamping circuits connected at least one to each of the amplifier channels, wherein each clamping circuit in succession clamps to a bias potential at or near ground potential at a particular time in each gating cycle and remains in that state until the next clamping circuit is energized, at which instant the former clamping circuit cuts off its associated amplifier channel.

A further object of this invention is to provide a phase detector circuit wherein a Magnetron Beam Switching tube provides discrete sampling of incoming signals at precise times throughout a full period of the signal frequency.

Reference is now made to the drawings in which.

Figure 1:
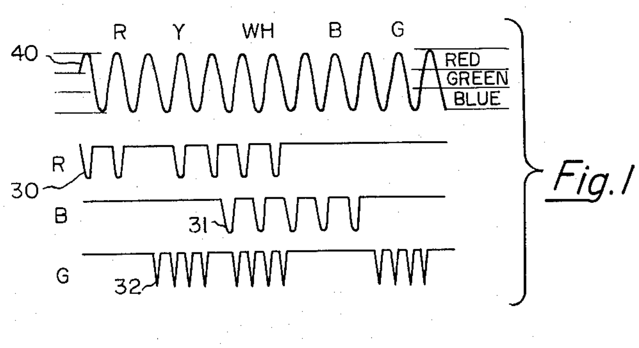
FIG. 1 is a graphical reproduction of gating pulses useful in a color television circuit.

FIG. 1 shows the waveforms of a color gating system wherein the three colors, red, green, and blue are mixed to reproduce white signals and are varied to provide color signals. From inspection, it can be seen that the gating signals 30, 31 and 32 for red, blue and green respectively are approximations of half-cycles of a sine wave, synchronized with switching signal 40 which moves the beam over the red, green, and blue phosphor strips. When there is no amount of a particular color present in a signal, the gating pulses for that particular color go to zero amplitude at the reference voltage for such pulses, as will be noted for red gating signal 40 during blue and green signals. In this manner the correct amount of color in each of the three primary colors is produced. The circuit of FIG. 3 provides improved gating of the beam for this method, as will be described.

Figures 2, 4:
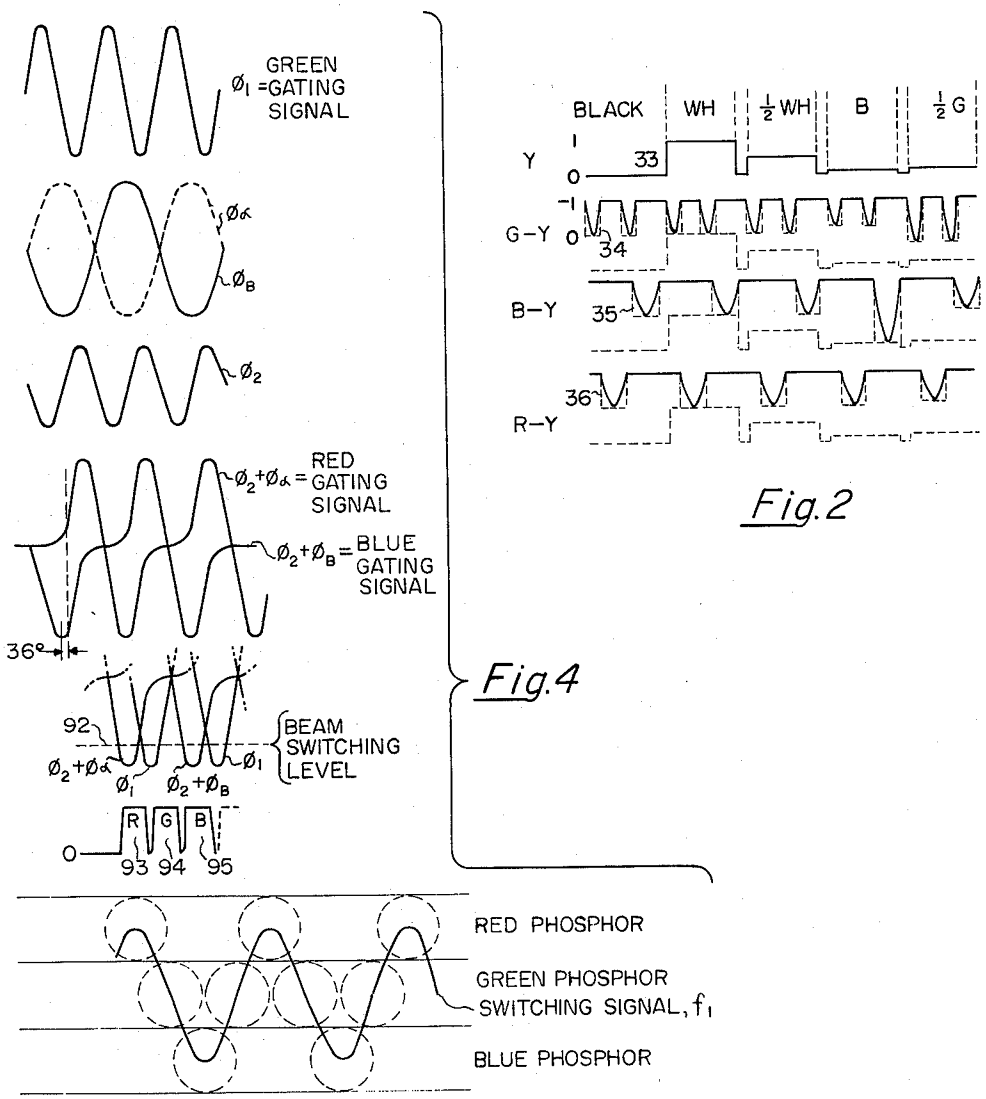
FIG. 2 is a graphical reproduction of different gating pulses useful in a different color television circuit.
FIG. 4 is a graphical presentation of the gating and switching signals of this invention.

FIG. 2 shows the waveforms for the gating signals of a system wherein color difference signals are mixed with a luminance signal within the color tube's electron gun, to reproduce the colors and luminance of a signal. Gating signals 33, 34, 35 and 36 for luminance signal Y, green chrominance signal G—Y, blue chrominance signal B—Y, and red chrominance signal R—Y respectively are shown for various color inputs. Factors having to do with the relative light-producing efficiency of various color phosphors and band width requirements for gating circuits indicate that red might be the color which is illuminated twice per color-sampling cycle. However, the arrangement of FIG. 2 is used to illustrate a working embodiment for this invention. When color difference signals such as G—Y, are used to control the amplitude of gated video circuits, the gated pulses cannot go to zero amplitude at the reference voltage for such pulses when the corresponding color difference signals go to zero but must go to a mean value corresponding to absence of that particular color, about which both positive and negative fluctuations are possible for representing, respectively, color and luminance intelligence as contained in such color difference signals. Accordingly, the color-difference signals 34, 35 and 36 will go to this mean value for each gating pulse when no color signals are received. This mean value swings the voltage of the electron gun's control grid from cut-off to zero. When a full white signal is received, the luminance signal 33 swings the cathode of the electron gun from a cut-off bias to zero. As shown in FIG. 2, the combination of these mean value pulses on the grid and full luminance signal on the cathode reduces the total bias to zero for each color's gate, and the proper current will flow in each successive pulse to cause the phosphors to produce the color combination for full white.

Figure 5:
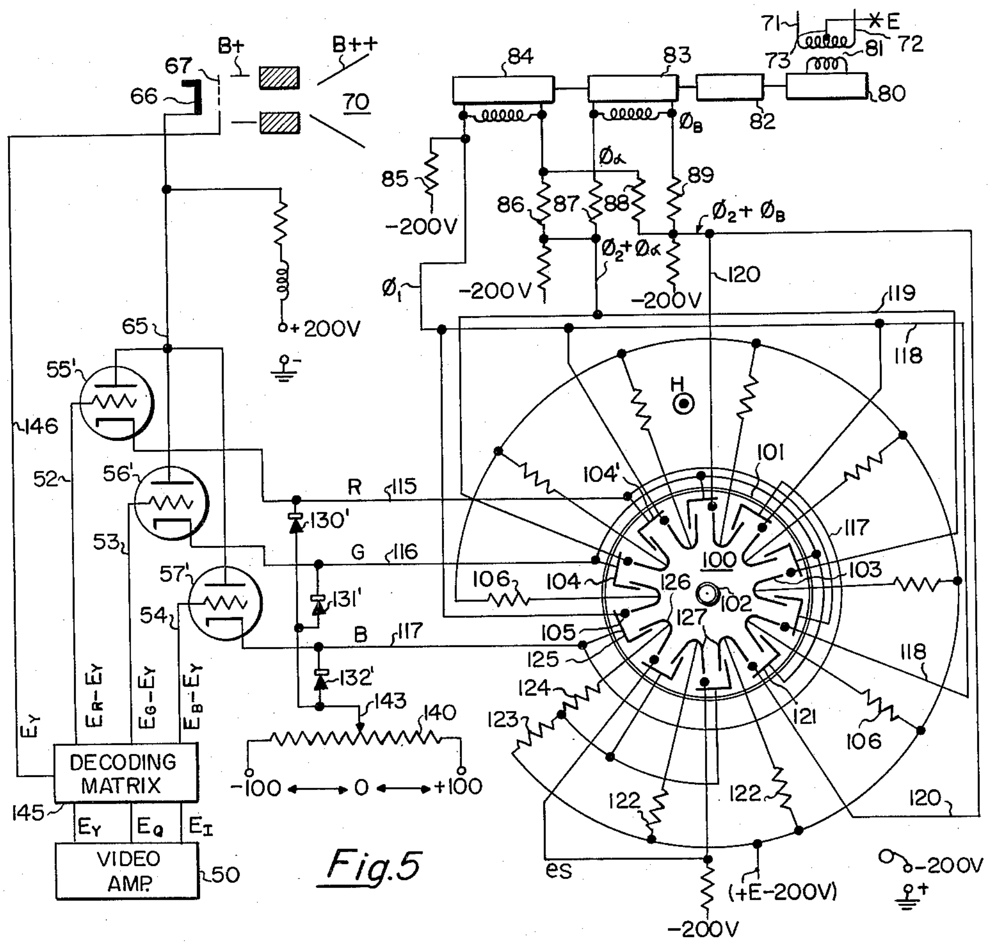
FIG. 5 is a schematic diagram of another gating and switching circuit embodying this invention.

To illustrate how the various signals vary for the reproduction of other color combinations, the pulse amplitudes for half-white, blue, half-green and no color or light at all, are shown in waveform 33. The circuit of FIG. 5 provides improved gating for this method, as will be described.

Figure 3:
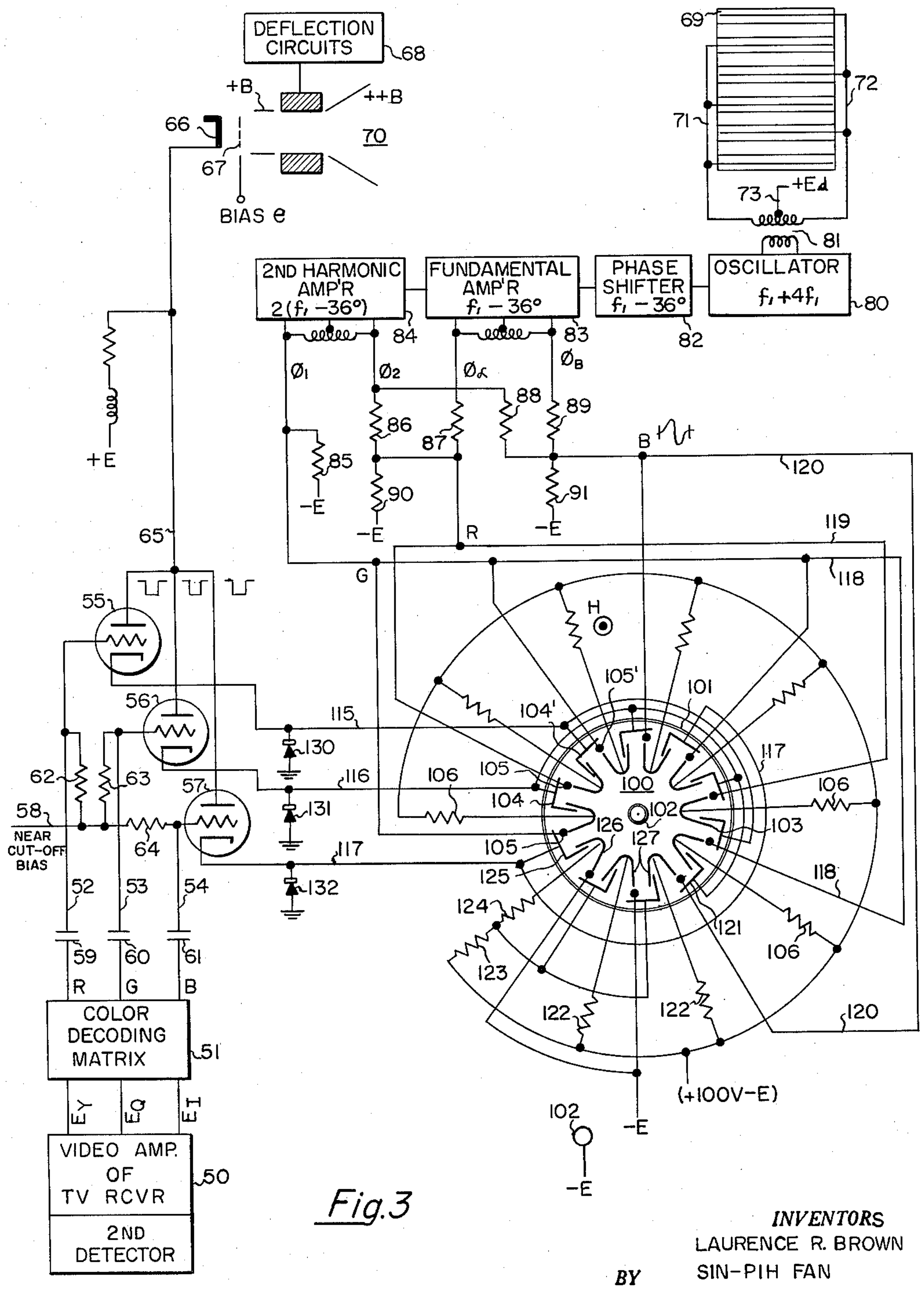
FIG. 3 is a schematic diagram of one gating and switching circuit embodying this invention.

FIG. 3 shows a gating and switching circuit embodying this invention. As stated in the above-referenced "Second Color Television Issue," p. 66, the color picture signal can be expressed:

$$E_M = E_Y + E_Q \sin(wt+33°) + E_I \cos(wt+33°) \quad (1)$$

where $$E_Q = 0.41(E_B - E_Y) + 0.48(E_R - E_Y) \quad (2)$$

$$E_I = 0.27(E_B - E_Y) + 0.74(E_R - E_Y) \quad (3)$$

$$E_Y = 0.59\, E_{Green} + 0.30\, E_{Red} + 0.11\, E_{Blue} \quad (4)$$

and $$w = 2\pi \times \text{color subcarrier}$$

Within the receiver which requires the primary color signals; the red, green, and blue signals can be reconstructed from the demodulated video signals as follows:

$$E'_{Red} = 0.96E_I + 0.63E_Q + E_Y$$

$$E'_{Green} = 0.28E_I - 0.64E_Q + E_Y$$

$$E'_{Blue} = 1.11E_I + 1.72E_Q + E_Y$$

Figure 10:
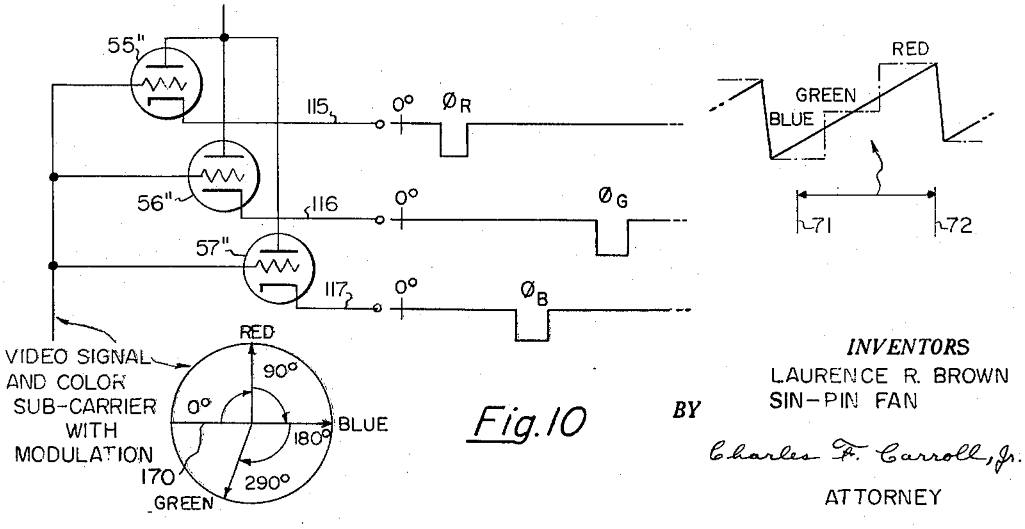
FIG. 10 is a schematic circuit of a further gating and switching circuit using phase detection of the raw color video signal.

While the video signals obtained from the intermediate frequency signals can be applied directly to a phase detector and the color signals obtained by sampling the amplitude of this signal at phase angles corresponding to the primary colors as shown in FIG. 10, the circuit illustrated in FIG. 3 demodulates the video signals to obtain the $E_Y$, $E_Q$ and $E_I$ video modulation therefrom. These signals are then amplified and applied to decoding matrix 51. The decoding matrix is a network of voltage dividers to add several inputs in varying proportions to obtain several outputs.

Typical decoding matrices for this operation are shown and described on pp. 201–203 of the above referenced "Second Color Television Issue." Matrix 51 performs this operation, producing the red color signals on lead 52, green color signals on lead 53, and the blue color signals on lead 54. Video amplifiers 55, 56, and 57 are connected respectively to leads 52, 53, and 54 through coupling capacitors 59, 60 and 61. These amplifiers are held at or near cut-off bias by a negative voltage on the control grids through resistors 62, 63, and 64. Color signals particular to their respective primary colors will drive the respective grids up from cut-off into a conducting portion of their dynamic characteristics. When their respective cathodes are brought to near ground potential by the gating action of tube 100 or 150, these amplifiers provide a video signal on lead 65 to cathode 66 of color tube 70.

Oscillator 80 provides a switching frequency $f_1$ which drives both the switching and the gating circuits. Transformer 81 couples oscillator 80 to deflecting wires 71 and 72. Wires 71 are positioned in optical alignment with blue phosphor strips of phosphor face 69. Wires 72 are positioned in optical alignment with red phosphor strips of face 69. With only the high positive accelerating voltage $+E_a$ applied to lead 73, both wires would be at same potential and the electron beam would be controlled by deflection circuit 68 to strike the green phosphor strips between red and blue strips. When a suitable voltage at frequency $f_1$ is applied to wires 71 and 72, the beam will deflect to move over the strips, being drawn to the strip under the more positive wire. This switching of the beam proceeds in a cycle "green, red, green, blue" of four color illuminations per cycle. With different arrangements of color strips, such as having red strips in the mid position between green and blue strips, the gating connections and switching connections would be changed to accommodate a cycle "red, green, red, blue." With the phosphor strips as shown in face 69, the alternating voltage on wires 71 and 72 switch the beam up and down in a "green, red, green, blue" cycle as deflection circuit 68 sweeps the beam horizontally across each set of phosphor strips. To generate color dots which are closer together than the human eye's resolving power, this switching cycle may be repeated 350 times per horizontal sweep. As stated on p. 309 of referenced "Second Color Television Issue," this corresponds to a switching frequency in excess of 6 megacycles. With dot interlace, this frequency is cut in half. Accordingly, frequency $f_1$ is useful in the range of about 3 to 3½ megacycles to provide color dot sequential operation.

Oscillator 80 also provides voltages which are used to produce the gating pulses for red, green, and blue video amplifiers. The principles of Fourier's analysis, wherein a complex wave is broken down into a fundamental frequency and a series of harmonics, can be used to provide particularly timed gating pulses throughout a cycle of a reference frequency. The particular phase angles at which a switching voltage is to be provided are determined and a complex wave which swings negative sharply at these phase angles is drawn. A Fourier analysis of this complex wave is made, and the result is a statement of what harmonic generators and phase shifters are required to produce the particular gating signals required by the various switching grids around a Magnetron Beam Switching tube. In this manner successive beam positions of the Magnetron Beam Switching tube can gate amplifiers on at discrete phase angles, providing highly complex phase detection in a flexible yet reliable manner.

When negative voltage peaks are required at four equally spaced points throughout a cycle of the switching frequency $f_1$, as shown in FIG. 4, two opposite phases of $f_1$ can be combined with one phase of the second harmonic, $2f_1$, to provide two of the required negative peaks. The other phase of the second harmonic provides the other two negative peaks, substantially equally spaced from the combinations of fundamental and second harmonic. The phase shift which results when the fundamental and second harmonic arc combined is used to an advantage to obtain this substantially equal spacing of the four negative peaks. However, inspection of FIG. 4 shows that this shift moves the negative peaks about 36° ahead of the peaks for the fundamental wave. Accordingly, a 36° phase shift is introduced, to provide for the red and blue gating signals to reach peak negative values at substantially the same time as the switching voltage reaches its peak values. Thus the voltage at frequency $f_1$ is shifted in phase to lag about 36° behind oscillator 80. This voltage ($f_1$—36°) is then amplified and provided as a dual or "push-pull" output from amplifier 83. The second harmonic of this voltage 2($f_1$—36°) or ($2f_1$—72°) is further amplified in amplifier 84 and provided on a similar balanced or "push-pull" output. Fundamental outputs are indicated as $\theta_a$ and $\theta_\beta$ which are 180° apart in phase. Second harmonic outputs are indicated as $\theta_1$ and $\theta_2$, also 180° apart in phase.

These outputs are combined in a matrix or resistor network to produce grid-switching signals for a Magnetron Beam Switching tube 100. Fundamental output $\theta_a$ is connected to resistors 87 and 90. Second harmonic output $\theta_2$ is connected to resistors 86 and 90. The voltage across common resistor 90 is a sum of outputs $\theta_a$ and $\theta_2$. The negative-going half of the resulting wave is used to switch the beam of tube 100 to one of the outputs which gate the red video amplifier on. Second harmonic output $\theta_1$ is used directly to switch the beam to outputs which gate the green video amplifier on. Fundamental output $\theta_\beta$ and second harmonic output $\theta_2$ are combined through the network of resistors 88, 89 and 91 to produce a wave which switches the beam to outputs which gate the blue video amplifier on.

Figure 9:
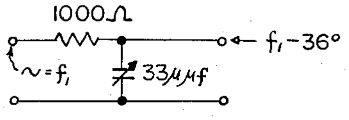
FIG. 9 is a schematic circuit of one means for obtaining a phase shift.

The phase of these various outputs and the resulting signals for switching the Magnetron Beam Switching tube 100 are plotted in FIG. 4. The combinations of $\theta_2+\theta_a$ and $\theta_2+\theta_\beta$ are seen to have steep wave fronts on their negative-going portions, reaching a minimum value (or maximum negative excursion about 36° before the fundamental outputs $\theta_a$ and $\theta_\beta$ reach their minima. Accordingly, these negative going peaks for $\theta_2+\theta_a$ and $\theta_2+\theta_\beta$ are made to coincide with the maximum excursion of switching signal $f_1$ by feeding signal $f_1$ through phase shifter 82 and thereby introducing a phase lag of 36° between $f_1$ and the outputs of amplifier 83. Phase shifter 82 can be any suitable circuit. A preferred shifter is shown in FIG. 9, where the 1000 ohm resistor and 33 micro-micro-farad capacitor draw a current which leads the applied voltage by about 55° and produces a voltage across the capacitor which lags the applied voltage by about 35°. These values are useful only for $f_1$=3.58 megacycles. For other switching frequencies, other capacitors will be required. Phase shifter 82 is made adjustable so as to be able to correct overall phase shift for variations in the other circuits of a color television reproducer.

The outputs from amplifiers 83 and 84 can be adjusted so that the waveforms ($\theta_2+\theta_a$), ($\theta_1$), and ($\theta_2+\theta_\beta$) exceed the negative value required to switch the tube 100. As will be described later, the tube 100 then will switch when beam switching level 92 is reached by a particular switching element in tube 100. This amplitude adjustment provides a fine adjustment of time-of-gating for each color, which adjustment is inherently stable since its timing is determined by the drop of a rigidly controlled wave to a fixed level. This provides accurate control of the time each video amplifier is gated on, permits use of maximum illumination time per sample, and is independent of the sharpness of the gating pulses $\theta_2+\theta_a$, $\theta_1$, and $\theta_2+\theta_\beta$ after they switch tube 100. As shown in FIG. 4, the respective gating pulses 93, 94, and 95; which turn on video amplifiers 55, 56 and 57; are turned on quickly when pulses applied to tube 100 reaches level 92 and remain on until the next pulse reaches level 92 and switches the next amplifier on. To take full advantage of the long interval each video amplifier is on, and to avoid color dilution which would be caused by a particular video remaining on as the switching voltage on wires 71 and 72 deflected the electron beam to the next phosphor strip, the switching voltage on wires 71 and 72 should have a complex waveform permitting longer dwell on each phosphor strip and rapid switching between strips. The addition of some fourth harmonic voltage to $f_1$ as it is applied to transformer 81 will achieve this result. This technique is generally described in the U.S. Patent No. 2,143,933 issued to R. Barthelemy and titled "Television Receiver." This complex wave will deflect the color tube's beam so as to provide greater dwell time on each phosphor strip and can be phased so these dwell times coincide with the gating of the associated video amplifiers.

Switching signal $f_1$ and its deflection of the electron beam to the three phosphor strips of a particular line are shown in FIG. 4. The phase angle between $f_1$ and $\theta_\beta$ also is shown.

Returning to the circuit of FIG. 3, the Magnetron

Beam Switching tube 100 is a multi-position beam tube of the type shown and described in U.S. Patent No. 2,721,955 to Sin-Pih Fan et al. This tube 100 comprises an evacuated and sealed envelope 101, an elongated cylindrical cathode 102 around which are disposed co-axial and concentric arrays of electrodes. The array nearest the cathode comprises a plurality of trough shaped elements 103 with their convex surfaces facing the cathode 102. Elements 103 are commonly known as spades. Surrounding the first array is a second array of collector electrodes 104, commonly called targets. Each target 104 has a portion thereof aligned to cover the space between adjacent spades 103, and a short extension at one edge of this aligned portion which extension extends toward the concave surface of a spade. A third array of switching electrodes or grids 105 is positioned between the spades and the targets. Each grid 105 is aligned with an extending side portion of a spade 103 and near the edge of target 104 which is opposite to the short extension edge of the target. A magnetic field represented by arrow head H permeates tube 100, with its flux flowing toward the observer of FIG. 3. The strength of field H is adjusted to about twice the magnetron cut off value, for about +100 volts on the spades 103. If one of spades 103 is lowered to near zero volts, the electrons circling cathode 102 will form a beam which grazes one side of that spade and impinges upon the adjacent target 104. Once the beam is formed, a small portion of the beam falls upon the spade and produces an IR voltage drop in the series connected spade resistor 106 which holds the beam stably in that position.

However, a negative voltage applied to the grid 105, which is nearest the target 104 currently taking the beam current, causes the beam to fan out toward that grid 105 until it strikes the next spade 103 as well. This current produces a voltage drop in this next spade which causes the beam to switch to the next target. This switching action can be produced by lowering the potential of the grid 105 which is in the same inter-spade space as is the beam, drawing the beam over to the next spade and thence to the next target. Similar voltage variation on grids other than the one near the electron beam do not cause this switching. The beam switches from one target to the next within a small fraction of a microsecond of when the grid reaches switching potential 92, and remains on this next target in a stable condition until the next grid gets a lowered switching potential 92. With a proper sequence of switching potentials on sequential grids 105, the electron beam advances clockwise around tube 100, energizing each target 104 in succession.

Figure 8:
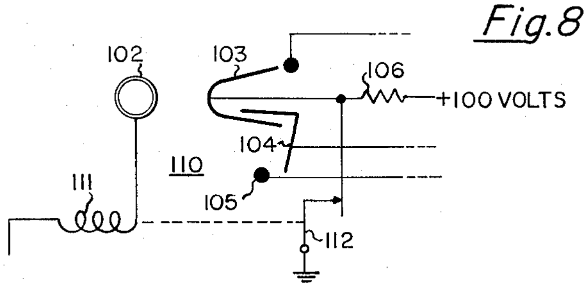
FIG. 8 is a schematic of one means for starting the switching tube.

The magnet of a Magnetron Beam Switching tube holds the tube at magnetron cut-off. To start the Magnetron Beam Switching tube, an electron beam must be formed to one of the beam holding positions, and this is done by depressing the voltage on one spade. The initial depression of the voltage of one spade in order to form the beam can be done by a variety of manual or automatic methods. A method is as shown in FIG. 8, where the winding 111 of relay 110 is in series with circuit connections to cathode 102. Also, relay winding 111 could be in other current conducting leads as shown in copending application, Serial No. 529,661, now U.S. Patent No. 2,794,147, by John R. Bethke and titled "Beam Tube Switching Circuits." Contact 112 is closed when relay 110 is not energized, holding spade 103 at ground potential. As cathode 102 warms up and emits electrons, the distorted electrical field around the grounded spade causes the electrons to form a beam which grazes spade 103 and hits target 104. This beam current flows through winding 111 and opens contacts 112, but the beam remains stably upon spade 103 and target 104 due to the IR voltage drop beam current causes in resistor 106. Upon lowering the potential of grid 105, this beam is switched to the next target. If for any reason the beam is momentarily cut off, relay 110 closes and the whole beam forming cycle repeats.

Returning to FIG. 3, consider the beam has been formed on target 104', at about "11 o'clock" on the plan view of tube 100. This target 104' is connected to lead 115 which in turn is connected to the video amplifier 55 for red color signals. The grid 105' which is near this beam position is connected via lead 118 to output $\theta_1$ of amplifier 84. Output $\theta_1$ depresses the potential of this connected grid 105 and causes the beam to switch to the next target in the clockwise direction which is connected to lead 116 which in turn is connected to the video amplifier 56 for green color signals. From inspection of FIG. 4, it can be seen that the next wave to go negative is the combination of $\theta_2+\theta_\beta$. Output combination $\theta_2+\theta_\beta$ is applied via lead 120 to the grid 105 nearest the beam's position. When $\theta_2+\theta_\beta$ reaches switching level 92, the beam advances to the next target. This next target connects to lead 117 which in turn is connected to the video amplifier 57 for blue color signals. The next grid 105 is connected to output $\theta_1$ via lead 118 and upon receiving the next negative swing of $\theta_1$ switches the beam to the next target which connects via lead 116 to the video amplifier 56 for green color. The next negative signal is $\theta_2+\theta_\alpha$ on lead 119 which switches the beam to a target which gates the red video on and starts another cycle. The above sequence of red-green-blue-green completes one sampling cycle.

When the tube 100 has a number of targets 104 which is not a multiple of 4 (4, 8, 12, etc.) then some positions must be skipped to maintain the cyclic order of energization of the several video amplifiers. When the beam reaches target 121, connected to lead 116, the next switching signal is $\theta_2+\theta_\beta$ on lead 120, must switch to a target connected to lead 117 since it is blue's turn in the color sequence. Four more targets would be needed for another complete cycle, and there are only two targets left in the usual 10-position tube. Accordingly, these intervening targets are connected only to the tap on resistors 123—124 which connect to spade 126. Spades 127 are connected to the +100 volts through resistors 122 which are lower in ohmic value than resistors 106. When the beam is switched from target 121 to the next target, spade 127 cannot develop adequate IR voltage drop to hold the beam stably, but can only hold it for a very short time in the order of .1 microsecond or less. During this short period, beam current to the associated target flows through resistor 123 and lowers the potential of spade 126 to where it takes the beam away from spades 127 which are not holding it stably in any event. Resistors 123 and 124 in series are equal to the ohmic value of resistors 106, enabling spade 126 to hold the beam stably on target 125. In this manner, the targets between targets 121 and 125 are skipped and the proper color sampling sequence is maintained. This technique is fully described in copending application, Serial No. 568,459, now U.S. Patent No. 2,857,550, by Rudolph Cola entitled "Variable Counter Circuit."

A magnetron beam switching tube having only 8 positions could be used, as will be described in connection with FIG. 6. In that embodiment no positions need be skipped, as the number of positions is integrally related to the number of color samples per switching cycle.

Again considering the beam as formed on target 104', electrons will flow on lead 115 to the cathode of amplifier tube 55 and through diode 130 to ground. With diode 130 conducting, the cathode of tube 55 is effectively clamped to ground and red video signals applied on the tube's grid through lead 52 will appear in amplified form on plate lead 65 and applied to cathode 66 of color tube 70. Since the video signals on lead 65 are negative going from a positive level, they are applied to the cathode 66 rather than to grid 67. Grid 67 receives only a bias voltage, *e*, necessary to optimum operation of color tube 70.

When the electron beam is switched to a target connected to lead 116, diode 131 is made conductive and clamps the cathode of tube 56 to or near to ground potential. When this switching occurs, tube 55 is cut off and tube 56 is made operative, causing the green video signal on lead 53 to be amplified and to appear on lead 65 to drive color tube 70. Similarly, when the electron beam is switched to a target connected to lead 117, diode 132 is made conductive and clamps the cathode of tube 57 to or near to ground potential, causing the blue video signal on lead 54 to be amplified and to appear on lead 65.

This gating of the video signals for the three primary colors to control beam intensity in the color tube 70 is synchronized with the switching signal $f_1$ applied to wires 71 and 72. This relationship is shown in FIG. 4. The beam of color tube 70 is on the red phosphor strip when the red video signal is gated through, on the green phosphor strip when the green video signal is gated through, and on the blue phosphor strip when the blue video signal is gated through. Each gating occurs at a precisely controlled time in a color sampling cycle, and keeps its video amplifier operating at a fixed level until the next gating action occurs.

Figure 7:
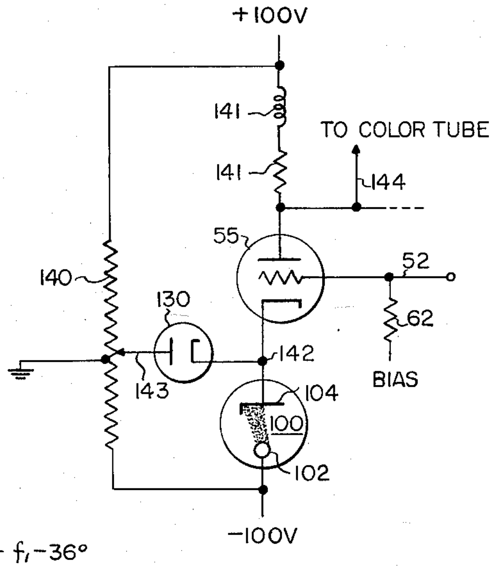
FIG. 7 is a schematic of the circuit to show the clamping action of the switching tube.

The clamping action is shown in the schematic circuit diagrams of FIG. 7. A portion of the overall circuit is shown, since each video circuit will function in the same manner. Beam switching tube 100, video amplifier tube 55, and tube load 141 are connected between −100 volts and +100 volts, for a total voltage difference of 200 volts. With the cathode-plate resistance of tubes 100 and 55 of about the same magnitude, when the beam is on that particular target 104, the connection between target 104 and the cathode of tube 55 would be midway between, or somewhere near ground potential. Under these conditions, the bias on tube 55 is adjusted so that point 142 is slightly negative with respect to tap 143 on potentiometer 140, and diode 130 conducts, clamping point 142 to a potential very close to the potential of tap 143 which is near ground or zero potential. Signals applied on lead 52 then will appear in amplified form on lead 144, for application to the cathode 66 of color tube 70. When the switching signals applied to grids 105 of tube 100 move the beam to the next target, point 142 goes positive, cutting off diode 130 and tube 55 very quickly. This clamping action is disclosed and claimed in the aforementioned patent of Kuchinsky and Moss, entitled "Multiplexing System."

FIG. 5 shows a second embodiment of this invention useful in systems where color-difference and brightness signals are utilized and are mixed within the electron gun of color tube 70 to give a balanced color and brightness in the picture on the tube face. Again, video amplifier 50 of a television receiver utilizes signals as follows:

$$E_M = E_Y + E_Q \text{ Sin } (wt+33°) + E_I \text{ Cos } (wt+33°) \quad (1)$$

where $E_Y$, $E_Q$, and $E_I$ are as stated in Equations 2, 3 and 4. As derived and stated on p. 69 of referenced "Second Color Television Issue," this signal can be demodulated and transformed in a matrix unit 145 to the following signals:

$$E_M = E_Y + 1.44(E_G - E_Y) + 0.41(E_B - E_Y) - 0.48(E_B - E_Y)$$

The system of color-difference and brightness signals has been most useful with 3-gun cathode ray tubes. When used in a single gun tube, where the color-difference signals are gated to the electron gun in a time sharing arrangement, the waveforms must be related as described for FIG. 2. As earlier stated, these sinusoidal gating pulses limit the duty cycle for each color and can distort the video they gate on and off. The embodiment of this invention shown in FIG. 5 gates each video amplifier on for a maximum percent of each sampling cycle and holds it steadily at an optimum operating condition while it is on.

The output signals $\theta_2+\theta_\alpha$, $\theta_1$, and $\theta_2+\theta_\beta$ are developed in amplifiers 83 and 84 and applied to leads 119, 118 and 120 as described for FIG. 3. Magnetron Beam Switching tube operates as described for FIG. 3, applying gating pulses to leads 115, 116 and 117 as the targets connected thereto receive the beam current of tube 100. Bias on tubes 55', 56' and 57', is adjusted by movement of contact 143 on potentiometer 140. This bias control is necessary to enable each tube 55', 56' and 57' to generate the mean value pulse each time its respective lead of leads 115, 116, and 117 is pulsed and its respective diode of diodes 130', 131' and 132' becomes conductive. These diodes clamp the respective cathode circuits to the potential of contact 143, thereby providing the grid-to-cathode voltage which permits a mid-range current to flow on output lead 65 for each gating pulse and to provide the before described mean value pulses representative of the absence of a particular color. For comparison, the video amplifier output pulses produced by these essentially square-wave gating pulses are shown in dotted outline on FIG. 2, showing how much more area (and hence more illumination by that signal) is contained in each square pulse than in the sinusoidal pulse.

Decoding matrix 145 can be any suitable resistance network which combines the Q and I signals as follows:

$$E_R - E_Y = 0.62Q + 0.96I$$

$$E_G - E_Y = -0.64Q - 0.28I$$

$$E_B - E_Y = +1.7Q - 1.1I$$

Several forms of resistance, voltage-divider networks are well known for this purpose. Alternatively, variable-gain vacuum tube amplifiers whose outputs are mixed in the above ratios also would provide these color-difference signals, though needing more complex circuitry to accomplish this result.

When these color-difference signals are gated on in tubes 55', 56', and 57' and applied through lead 65 to cathode 66 of color tube 70, they are there combined with luminance signals applied on lead 146 to grid 67, to provide video modulation of the electron beam of color tube 70. As with the primary color signals of FIG. 3, these color difference signals are gated on and off in synchronism with the switching frequency $f_1$ as applied to wires 71 and 72, switching the beam over the three color strips of each horizontal line of the tube face.

Starting devices and phase shifters can be the same as for FIG. 3.

Figure 6:
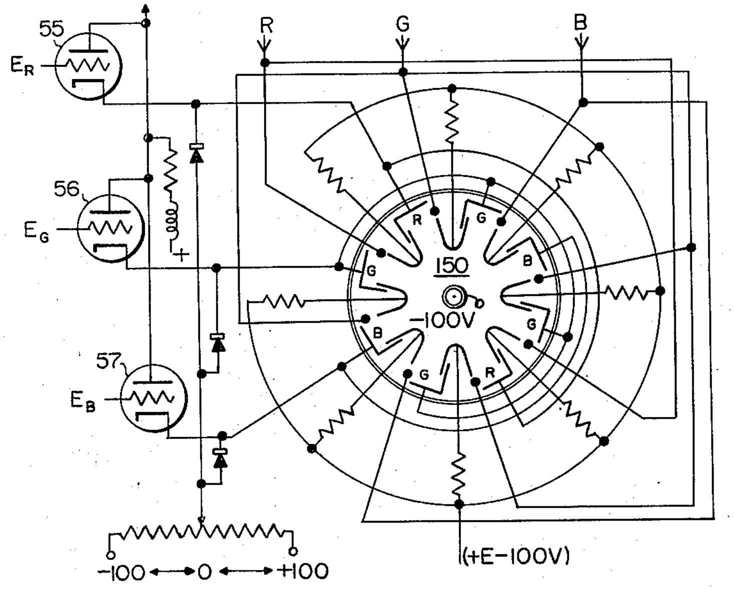
FIG. 6 is a partial schematic of a modified switching tube for use in the circuits of FIG. 4 and FIG. 5.

FIG. 6 shows a modified beam switching tube 150 which has eight targets and associated electrodes. This tube's advantage is that its number of targets (8) is integrally related to the number of color samples (4) per beam-switching cycle of $f_1$ on wires 71 and 72. Accordingly, no target-skipping is required to maintain the proper color sampling sequence. Once started, the tube will automatically fall in step with switching signal $f_1$, since the beam will not gate a blue video amplifier on until the $\theta_2+\theta_\beta$ signal goes negative to switching level 92, nor will it gate a red video amplifier on until the $\theta_2+\theta_\alpha$ signal goes negative to switching level 92, but it will wait in a stable beam-holding position until the proper point in a cycle arrives and then switch to the following targets.

As shown in FIG. 10, the phase detecting capability of this gating system can be used to select color video signals directly from the video signal before color demodulation. Video tubes 55'', 56'', and 57'' have their cathodes connected for sequential gating in a "blue-green-red, blue-green-red" sequence. This sequence is required because color sampling is determined by the phase at which each color is represented throughout a cycle of the video color sub-carrier as shown by rotating vector 170. The control grids of all three tubes are connected to the color video as available from a receiver's *i-f* amplifier. Since the amplitude of this video signal at particular phase angles around the 360° of a complete cycle represent the brightness of particular colors, gating a tube on at that phase angle representative of a particular primary color will derive a signal representative of the intensity of that color, i.e. its demodulated video signal. This precise gating is controlled by the switching grids of a Magnetron Beam Switching tube, driven by a complex wave which is built up from the fundamental and harmonics of the color subcarrier frequency to provide negative switching voltages properly phased to detect the color subcarrier's phases for blue, green, and red or for other combinations as needed. The switching frequency for color tube 70 also must be synchronized on the color subcarrier. This insures that wires 71 and 72 switch the beam to the proper color phosphor strip when the related phase of the video signal is detected and the associated video amplifier tube is gated to "on" condition. For example, if the color subcarrier is at that phase representative of red color, tube 55″ must be gated "on" and wires 71 and 72 must be driven to a voltage difference deflecting the beam to the red phosphor strip. With the color subcarrier's phase angles for red, blue and green determining the sequence, each of tubes 55, 56, and 57 would have to connect respectively to every third target of the Magnetron Beam Switching tube, and a complex voltage, such as the step-function or saw-tooth shown, would have to be applied to the beam deflecting wires 71 and 72. Also, a complex wave would have to drive the switching grids of the Magnetron Beam Switching tube to produce gating at phases $\theta_R$, $\theta_B$, and $\theta_G$ as shown.

What is claimed is:

1. In a color television reproducer utilizing a single gun, color type, cathode ray tube having deflecting wires after its primary deflecting means, a video signal gating system comprising a first oscillator source of switching signals having a balanced connection to deflecting wires of the single gun, color type, cathode ray tube, a second and third source of switching signals comprising amplifiers for the fundamental and second harmonic frequencies of said oscillator and connected in series to said first source to be driven thereby, a mixing network coupled to said sources and having three output circuits to provide three peaked output signals, wherein the peaked signal of one output occurs after each peaked signal of each of the other two outputs occurs, for a total of four peaked pulses during a cycle of said first source's switching signals, a magnetron beam switching tube including a cathode, a plurality of beam forming and holding electrodes, a plurality of switching grids connected to the three output circuits of said second source in the same sequence as the occurrence of peaked pulses on said output circuits, and a plurality of target electrodes, a plurality of video amplifiers each having a cathode connected to at least one of said target electrodes to receive electrons therefrom, a control grid to receive video input signals representative of a portion of the color information in a picture, and a plate electrode to provide said portion of the color information signals as an output signal when the beam of said beam switching tube strikes a target electrode connected to the cathode of said video amplifier to render it operative.

2. In a color television reproducer a video signal gating circuit comprising a first source of signals to switch the beam of a single gun, color type, cathode ray tube, a second source of signals driven in phased and synchronous relation to said first source of signals, a third source of signals driven by said second source to produce the second harmonic of the output of said second source of signals, a mixing network interconnecting the outputs of said second and third sources and having three output circuits to produce four peaked signals substantially equally spaced during a cycle of the signal of said first source, a magnetron beam switching tube including a cathode, a plurality of beam forming and holding electrodes, a plurality of switching grids connected to said three outputs circuits in a repetitive manner in the same sequence as said peaked signals occur and a plurality of target electrodes, and a plurality of video amplifiers each having a cathode connected to at least one target of said magnetron beam switching tube to receive electrons therefrom when the beam of said tube strikes said target, a control grid to receive video signals, and an output plate electrode to provide video output signals when said video amplifier cathode receives electrons from said target.

3. A color television signal switching system including a color picture tube containing a multiple-element phosphor screen and a plurality of sets of wire focusing electrodes for focusing an electron beam on the phosphor screen, signal means providing a plurality of continuously available output color information signals to be applied to said picture tube; a gate coupled to each of said output signals; a multi-position beam switching tube including a plurality of groups of electrodes, each including an output electrode, a spade electrode, and a beam switching electrode, said output electrodes and said beam switching electrodes being connected in separate sets, the sets being equal in number to the number of signals to be switched; generating means for producing gating signals including an oscillator coupled to said sets of wire focusing electrodes, a phase-shifting network, and a fundamental frequency amplifier and a second harmonic frequency amplifier all coupled together to provide a plurality of peaked switching signals of different phases; connections between said fundamental and second harmonic amplifiers and said switching electrodes whereby a separate switching signal is applied to each of said sets of switching electrodes; and a connection from each set of output electrodes to one of said gates whereby said gates are operated to control the passage of said output signals from said signal means; the operation of said oscillator and said gates being synchronized in their application to said picture tube so that the proper color information is applied to the proper corresponding element of said phosphor screen.

4. A color television circuit comprising a color producing cathode ray picture tube including a multiple-element phosphor screen and a plurality of sets of focusing electrodes for focusing an electron beam adjacent to said screen; a plurality of electronic gates each adapted to receive and pass one of a plurality of color signals to be applied to said picture tube; an electron beam switching tube having a cathode and a plurality of groups of electrodes; each group of electrodes including a target electrode which receives an electron beam and produces an output signal therefrom, a spade electrode which holds an electron beam on its associated target electrode, and a switching electrode which serves to switch an electron beam from one group of electrodes to the next; each of said target electrodes being coupled to and adapted to open one of said gates; said targets being connected in sequence to a corresponding sequence of said gates; in series, a sine wave oscillator, a phase shifter, a fundamental frequency amplifier, and a second harmonic amplifier; said fundamental frequency amplifier and said second harmonic amplifier each having a pair of output terminals between which generally sine wave output waves appear; one of the output terminals of said second harmonic amplifier being coupled to each of the two terminals of said fundamental amplifier and through a resistive network to provide, with one of the terminals of said second harmonic amplifier, three terminals from each of which a beam switching signal of different phase is provided; said three terminals being coupled in order to successive switching electrodes in said beam switching tube; said sine wave oscillator also being coupled to said sets of focusing electrodes in said cathode ray tube; the operation of said oscillator and said beam switching tube being synchronized so that the color signals applied to said cathode ray tube coincide with the focusing of an electron beam on the proper corresponding element of the phosphor screen by said focusing electrodes.

(References on following page)

References Cited in the file of this patent

UNITED STATES PATENTS

| | | |
|---|---|---|
| 2,143,933 | Barthelemy | Jan. 17, 1939 |
| 2,471,253 | Toulon | May 24, 1949 |
| 2,577,368 | Schultz | Dec. 4, 1951 |
| 2,721,955 | Sin-Pih Fan | Oct. 25, 1955 |
| 2,734,940 | Loughlin | Feb. 14, 1956 |
| 2,744,952 | Lawrence | May 8, 1956 |
| 2,773,118 | Moore | Dec. 4, 1956 |
| 2,798,114 | Schlesinger | July 2, 1957 |
| 2,840,633 | Raibourn | June 24, 1958 |

OTHER REFERENCES

Fink: Television Engineering Handbook, McGraw-Hill, 1957, pages 9–52 to 9–54.